United States Patent [19]

Sandberg

[11] Patent Number: 5,117,163
[45] Date of Patent: May 26, 1992

[54] DRIVE SYSTEM FOR RAILWAY VEHICLE

[75] Inventor: Lennart Sandberg, Västerås, Sweden

[73] Assignee: Asea Brown Boveri AB, Vasteras, Sweden

[21] Appl. No.: 599,747

[22] Filed: Oct. 19, 1990

[30] Foreign Application Priority Data

Oct. 24, 1989 [SE] Sweden ............... 8903515

[51] Int. Cl.⁵ ............................. B60L 15/32
[52] U.S. Cl. ......................... 318/52; 318/67; 318/71; 318/79; 364/426.05; 364/426.03
[58] Field of Search ............ 318/52, 112, 41, 59, 318/66-71, 77, 79; 303/791, 94, 100; 364/426.01, 426.03, 426.05

[56] References Cited

U.S. PATENT DOCUMENTS

| | | | |
|---|---|---|---|
| 1,857,760 | 5/1932 | Loughridge | 318/112 |
| 4,095,147 | 6/1978 | Mountz | 318/52 |
| 4,347,569 | 8/1982 | Allen et al. | 318/52 X |
| 4,709,194 | 11/1987 | Yagi et al. | 318/52 |
| 4,825,131 | 4/1989 | Nozaki et al. | 318/52 |
| 4,896,090 | 1/1990 | Balch et al. | 318/71 X |
| 4,950,964 | 8/1990 | Evans | 318/52 |

FOREIGN PATENT DOCUMENTS 8305869 7/1985 Sweden.
8600969 11/1987 Sweden.

Primary Examiner—William M. Shoop, Jr.
Assistant Examiner—David Martin
Attorney, Agent, or Firm—Watson, Cole Grindle & Watson

[57] ABSTRACT

A drive system with slip control for railway vehicles with two or more dc drive motors and with common control of the motor armature currents and a logic unit to which are input a measured signal which indicates the armature current intensity of the motor driving the axle having the best adhesion which is usually the trailing axle motor. The measured signal and an amplification signal are multiplied by each other and the product signal issued in a feedback loadsharing system to control the other motors such that the torque of the other motors increased to a maximum allowed level, the trailing axle then rolling very close to ground speed without slipping. This speed is used as a measure of the true speed, which in turn controls the system for loadsharing such that the vehicle can be controlled to maximum tractive effort without causing slipping axles.

15 Claims, 2 Drawing Sheets

DRIVE SYSTEM FOR RAILWAY VEHICLE

TECHNICAL FIELD

The present invention relates to a drive system for railway vehicles with at least two d.c. drive motors, with units for common control of that armature voltage which is supplied to one group of motors, with field control means for individual control of the fields of the motors, and with units for achieving uniform loadsharing between the motors by selectively influencing the fields of the motors in dependence on a comparison between the armature currents of the motors, and with particular reference to units the duty of which is to create a reference for this loadsharing system so that a maximum tractive effort can be obtained without the risk of overspeed on driven axles.

In the following, the word "motor" refers to a motor branch, i.e. a motor unit consisting of one or more motors which are connected or controlled such that each motor in the motor branch has equally great motor currents and equally great field currents.

The concept "common control of the armature currents" refers to a connection in which the armature currents of the motors are not individually controllable with respect to each other but in which at each moment those armature currents which are supplied to a commonly controlled group of motors are, in principle, equally great. In the following, such a group of motors is referred to as a "motor group".

The individual control of the fields of the motors can be accomplished by providing each motor with a controllable field convertor, which delivers field current to the excitation winding or excitation windings of the motors.

BACKGROUND ART

In control systems of the kind mentioned in the introduction, with a plurality of parallel-working separately-excited motors, because of unavoidable tolerances in the motors these will not share the load equally, i.e. their armature currents will be mutually different. Usually, each individual motor drives its own wheel axle and unavoidable variations in the wheel diameters will then contribute to a non-uniform loadsharing between the motors. This entails an incomplete utilization of the theoretically possible tractive effort. A solution to this problem is proposed in Swedish Pat. No. 8600969-3. According to this patent, difference signals, produced by differences between the armature currents in a first and a second motor and by differences between the armature currents in the second and a third motor, are utilized. These difference signals are then used as control signals for changing the fields in the three motors, so that the armature currents therein become equally great. This results in a maximally available tractive effort.

One condition for a satisfactory functioning of the loadsharing system according to the above is, however, that no wheel axles overspeed; that is to say, that the wheels are running at a higher speed than the ground speed of the vehicle, the wheel axle is slipping. The armature current in the motor concerned is greater than what is permitted by the adhesion between the driven wheels and the base. Upon such slipping, that of the parallel-connected motors which has the lower armature current will sense a voltage stiff source. Its armature current and torque thereby fall rapidly, i.e. the motor loses armature current as a result of the overspeed. The loadsharing system attempts to maintain the armature current and thereby counteracts this desirable relief in connection with slipping. One way of solving this problem is proposed in Swedish Pat. No. 8305869-3. This patent proposes forming for each motor a detected overspeed which constitutes the difference between the speed of the motor and a reference speed. The overspeed is allowed to control a signal which corrects the loadsharing system so that the load of the respective motor is placed in a favourable position in a so-called adhesion diagram. This means that each individual wheel axle is maintained near the slipping limit. The difficulty with this overspeed feedback control is to sense the true speed of the vehicle. This forms the basis for calculating the overspeed of the motors.

A simple way of sensing the true speed presents itself if the vehicle is equipped with an unpowered axle. If this is the case, this axle runs at ground speed which is converted to the desired reference speed.

An additional alternative for achieving a transducer for the ground speed of the vehicle is to install a radar which measures the speed of the vehicle in relation to ground. Such a ground radar functions well under most conditions. However, it has turned out that the failure tolerances of the radar are too great if it is utilized as a reference for the overspeed feedback control when this is to limit overspeeds to a maximum of 3 km/h. The accuracy of the radar is influenced by acceleration, deceleration, mounting angle, curves, and bridges.

At too high overspeeds, problems with torsional oscillations in the wheel axles may arise. These problems arise under relatively good adhesion conditions. The adhesion diagram of the wheel axle then shows a negative inclination for the curve which indicates the tractive effort of the motor as a function of the overspeed.

As an example, it has been found that torsional oscillations may arise during six-axle slipping if at the same time the radar shows a somewhat too high speed in relation to the true ground speed. The overspeeds result in a loss of tractive effort, which in turn leads to the vehicle losing speed and causes the radar instantaneously to show a still higher speed compared with that of the vehicle because the radar equipment has a somewhat time-delayed reaction. All this leads to an even higher overspeed with an ensuing risk of, inter alia, torsional oscillations in the wheel axles.

Radar failure indications of the above-mentioned kind are common under certain conditions. This means that the problems cannot be solved by small adjustments of the radar equipment or in the system for overspeed feedback control.

SUMMARY OF THE INVENTION

This invention describes how a reduction of the armature current in that motor, whose driving axle theoretically has the best adhesion, may prevent simultaneous slipping on all the driven axles of the motor, by the mentioned axle being driven with reduced axle torque and rolling without slipping. If such slipping is prevented, this axle with the lowest axle speed may be used as speed reference for the overspeed feedback control and the slip speeds may be maintained on the other driven axles. The current reduction is preferably carried out on the trailing axle since the adhesion is greater on that axle. The trailing axle normally has a better adhesion than the other axles and has a positive axle reloading, i.e. a higher load per axle under tractive conditions. For the sake of simplicity, the invention will be described in the following as if the current reduction is carried out on the motor of the trailing axle, but, in principle, it may be carried out on any optional axle with the best adhesion and also be moved between axles during operation if the control system is modified in accordance with the supplementary control units which are required for this.

If the slip speeds are maintained at the levels which are imposed by the system for overspeed feedback control, no torsional oscillations above specified limits will arise.

The desired reduction of the torque of a driving axle according to the above is brought about by a modification of the loadsharing system.

The loadsharing is carried out by reducing the field current on the drive motors which have lower armature currents. Reducing the field current means that the flux in the motor concerned is reduced. A reduced flux results in a reduction of the e.m.f. of the motor armature. The reduction of this e.m.f. then entails an increase of the armature current.

As described above, the loadsharing is controlled by the armature currents in each motor being recorded and controlling the loadsharing system by feedback of current values for the various motors to the feedback control system. In the present invention, the sensed armature current for the trailing axle motor is adjusted by a multiplication factor in a multiplier such that current value which is fed into the loadsharing system for the motor concerned is changed from the value 1 to, for example, 1.25 times the measured actual current value. This means that the loadsharing system believes that the armature current in the trailing axle motor is too high and the feedback control system initiates the loadsharing on the other motors in order to attain the same armature current in these. This would give rise to too high armature currents in these motors, but since they are also compared with the armature current reference in an armature current feedback control, this feedback control will see to it that the armature currents do not exceed the reference value. The effect of this is that the armature current in the trailing axle motor will be adjusted to a lower value than the other armature currents, since the loadsharing strives to adapt the armature current of each individual motor to the reference value for the armature current. If the drive system comprises a motor group which, for example, consists of three motors and the armature current for the respective motor is designated IA1, IA2 and IA3, respectively, the reference current IAREF and the factor in the multiplier is called GAIN, the relationship will have the following appearance:

$$IA1 * GAIN = IA2 = IA3 = IAREF$$

If several driving axles with associated motors occur on the vehicle, the above-described speed reference is utilized for control of these as well. A reduction of the axle torque on the trailing axle as described means that this axle functions as a kind of unpowered axle and when the speed of this axle is utilized as a reference for the overspeed feedback control, the creep control system may be utilized in full.

The logic for reduction of the torque of the trailing axle is switched in when this is justified in order to limit torsional oscillations while at the same time great tractive effort is required.

The main condition for switching in the current reduction is that the average armature current is lower than 90% of the armature current reference, with a hysteresis of up to 95% of the same. If the armature current is above 90% of the armature current reference, the wheels will not slip and the overspeed feedback control has not reduced the currents.

BRIEF DESCRIPTION OF THE DRAWINGS

The invention will be described in greater detail in the following with reference to the accompanying FIGS. 1-3. The FIGS. show a drive system with three motors supplied from a common armature convertor.

DESCRIPTION OF THE PREFERRED EMBODIMENTS

To provide a basis for the description of the function of the current reduction on the trailing axle, a description will first be given of the mode of operation of the loadsharing system as disclosed in Swedish Pat. No. 8600969-3. By way of introduction, the function of the entire system will be explained without being influenced by the additional units MPI, with the associated input signal GAIN, added in this invention (in FIG. 3).

Figure 1:
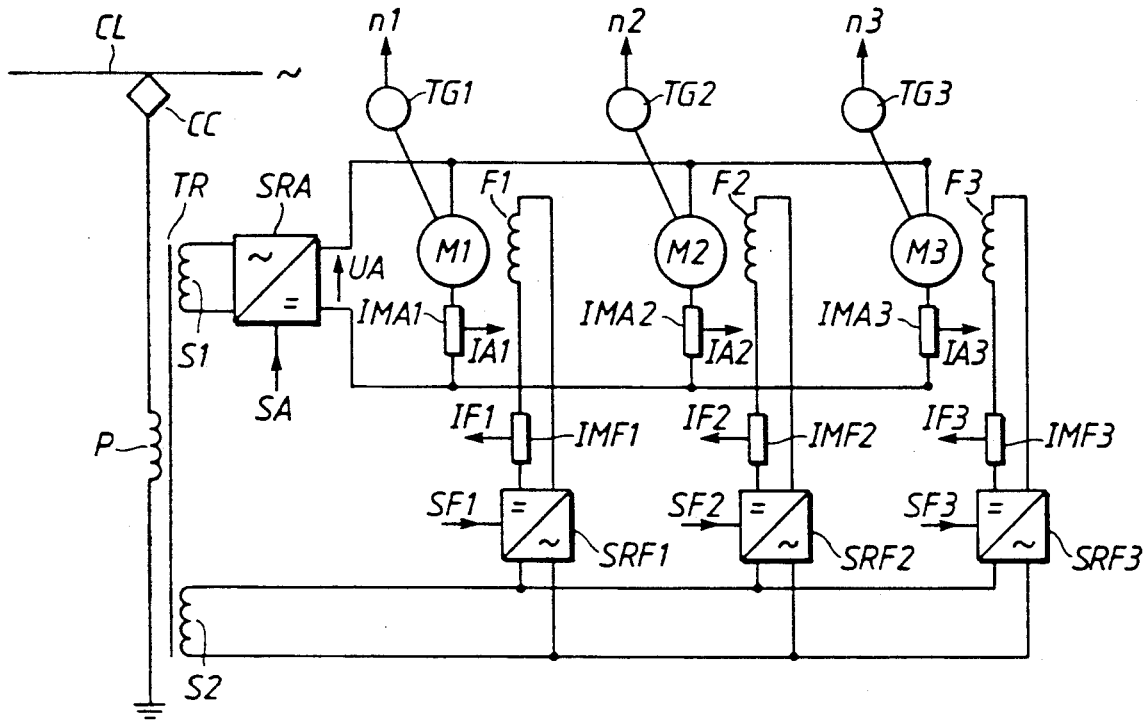
FIG. 1 shows the main circuits of the drive system.

FIG. 1 shows a drive system according to the invention in a railway vehicle, for example an electric locomotive or a motor coach. The system is supplied from an a.c. carrying aerial line CL. The primary winding P of the transformer TR arranged in the vehicle is supplied from the aerial line with the aid of a current collector CC. To a secondary winding S1 on the transformer, the armature convertor SRA of the vehicle is connected. The direct voltage UA of the armature convertor is controlled with the aid of a control signal SA (see FIG. 2) supplied to the convertor. The armatures of the three drive motors M1, M2 and M3 are connected in parallel to the direct voltage output of the convertor. With the aid of the current measurement devices IMA1, IMA2 and IMA3, which are connected in series with the motor armatures and which, for example, may consist of measuring shunts, the measured signals IA1, IA2 and IA3 are obtained which are proportinal to the armature current of the respective motor. The tachometer generators TG1, TG2 and TG3 are mechanically connected to the motors, the generators delivering measured signals n1, n2 and n3 corresponding to the speeds of rotation of the motors. To a second primary winding S2 of the transformer TR, the a.c. inputs of the three field currents SRF1, SRF2 and SRF3 are connected. The field windings F1, F2 and F3 of the motors are each connected to the d.c. output of a respective field convertor, which are each connected in series with a respective one of the current measuring devices IMF1, IMF2 and IMF3, which may consist of measuring shunts and deliver the measured signals IF1, IF2 and IF3 proportional to the field currents. The output voltages of the field convertors and hence the field current of their respective motor are controlled with the aid of control signals SF1, SF2 and SF3 supplied to the field convertors (see FIG. 3).

In a drive system of this kind, the armature currents of the motors and hence their tractive effort, the acceleration and speed of the vehicle are varied by varying the direct voltage supplied by the armature convertor. At speeds below the so-called base speed, which, for example, may be 50% of full speed, the motors are operating, in principle, with a full field. Upon acceleration from zero speed, the armature currents of the motors increase proportionally to the speed and the direct voltage of the armature convertor must be increased concurrently therewith. When the basic speed has been reached, the armature convertor is working at full voltage or near full voltage. To make possible an increase of the speed in excess of the basic speed, the field of the motors must be reduced, which, in a known manner, may be done by gradually reducing a field current reference, which is common to the three field convertors, with increasing vehicle speed.

Figure 2:
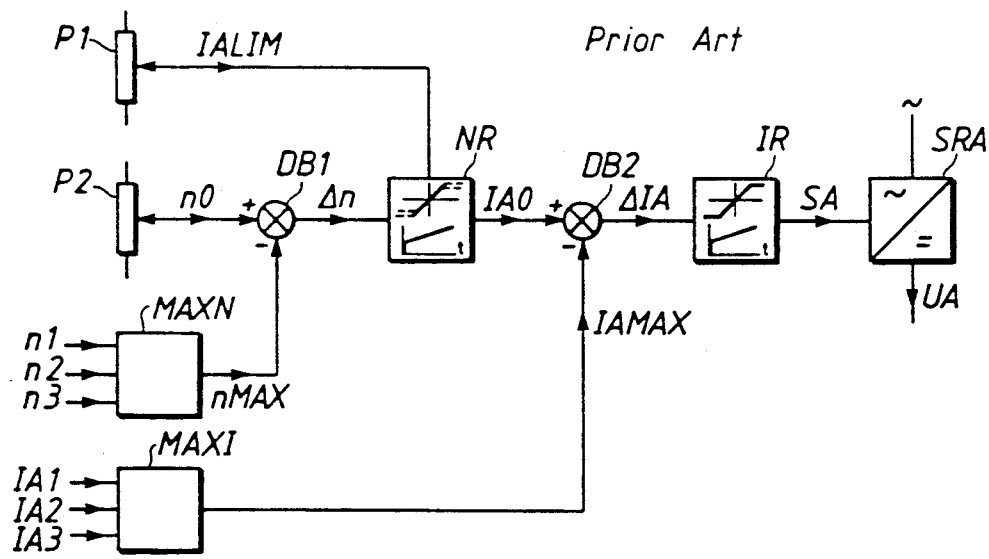
FIG. 2 shows the control equipment for the armature voltage.

FIG. 2 shows the circuits for control of the armature convertor SRA in FIG. 1. With the aid of a potentiometer P2, a speed reference value nO is set, which is supplied to a difference generator DB1. In a selection circuit MAXN, that of the three tachometer signals n1, n2 and n3, which corresponds to the highest of the three speed values, is selected. This value nMAX is supplied to the difference generator DB1, the output signal of which constitutes the speed error Δn and is supplied to a speed regulator NR with PI characteristic. The output signal of the speed regulator constitutes a current reference IAO for the armature convertor. This reference may be limited to the desired value with the aid of a limiting signal IALIM, which is received from a potentiometer P1 and is supplied to the speed regulator NR. The three armature current measurement signals IA1, IA2 and IA3 are supplied to a selector circuit MAXI, the output signal IAMAX of which is equal to the greatest of the three armature currents. This signal is compared with the current reference IAO in a difference generator DB2, the output signal ΔIA of which constitutes the current error and is supplied to a current regulator IR with PI characteristic. From the current regulator a control signal SA is obtained which controls the output voltage UA of the phase-angle controlled armature convertor SRA.

Figure 3:
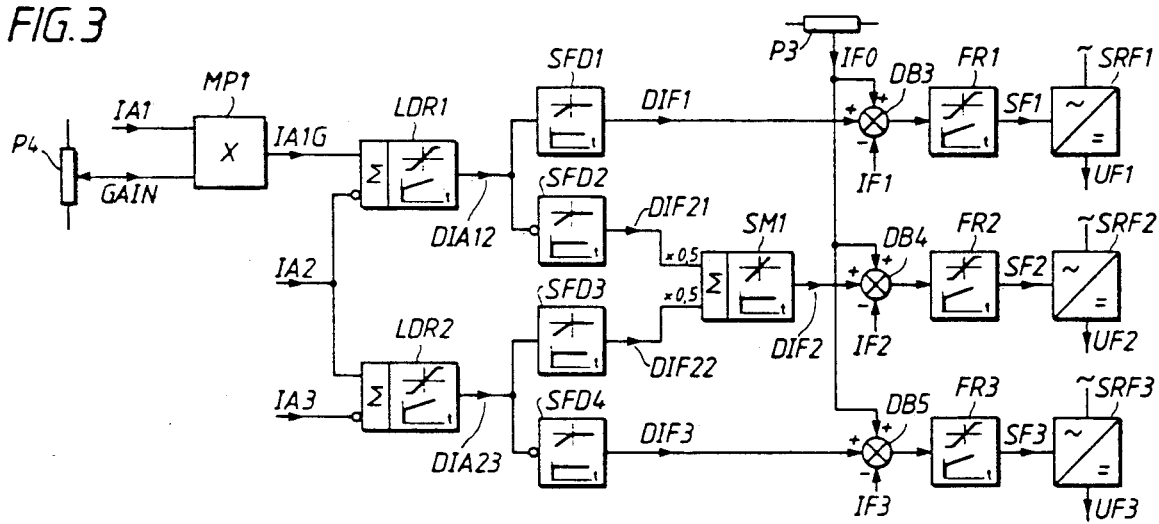
FIG. 3 shows the system for control of the field currents of the motors.

FIG. 3 shows the control system for three field convertors SRF1, SRF2 and SRF3 in FIG. 1. A field current reference IFO is set with the aid of the potentiometer P3 and is supplied to the three difference generators DB3, DB4 and DB5. To inverting inputs of the difference generators, the three measured field current values IF1, IF2 and IF3 are supplied. The output signals from the difference generators constitute the current deviation in the respective field current circuit and are supplied to the field current regulators FR1, FR2 and FR3. The output signals SF1, SF2 and SF3 of the regulators are supplied to the three phase-angle controlled field convertors and control their output voltages UF1, UF2 and UF3. In this way three closed control systems are obtained which strive to maintain the field current of each motor equal to the set reference value IFO. The system now described for control of the field currents (which is known per se) may be supplemented, in a know manner, by circuits (not shown) for automatic reduction of the field current reference at speeds exceeding the pasic speed, for reduction of the field currents upon slipping, etc.

To bring about a uniform loadsharing between the motors, two loadsharing regulators LDR1 and LDR2 are provided. The regulators have PI characteristics with a time constant of, for example, one or a few seconds. The output signal DIA12 of the regulator LDR1 is a function of the difference between the armature currents IA1 and IA2. In the same way, the output signal DIA23 of the regulator LDR2 is a function of the difference between the armature currents IA2 and IA3. The output signal or the difference signal DIA12 is supplied to two signal distributing circuits SFD1 and SFD2, the latter having an inverting input. In the same way, the difference signal DIA23 is supplied to two signal distributors SFD3 and SFD4, the latter having an inverting input. Each one of the signal distributors has the characteristic shown in the FIG., i.e. the signal distributors SFD1 and SFD3 will have the output signal zero upon a positive input signal and, upon a negative input signal, will deliver an output signal proportional to the input signal. In the same way, the signal distributors SFD2 and SFD4 will have the output signal zero upon a negative input signal and deliver an output signal proportional to the input signal upon a positive input signal.

The output signal DIF1 from the signal distributor SFD1 is supplied to an input of the difference generator DB3. If IA1 <IA2, the signals DIA12 and DIF1 will be negative irrespective of the integration interval constant, which from the point of view of the field regulator FR1 is interpreted as a reduction of the field current reference IFO and leads to a corresponding reduction of the field current in the motor M1. In this way the armature current of the motor M1 tends to increase and a closed control loop is obtained, which increases IA1 until IA1 =IA2. In a corresponding way, the output signal DIF3 from the signal distributor SFD4 is supplied to an input of the difference generator DB5. If IA2 >IA3, the signal DIF3 will be negative, which results in a weakening of the field in the motor M3 until the control loop thus closed has caused IA3 to become equal to IA2 (IA3 =IA2). The output signals DIF21 and DIF22 from the signal distributor SFD2 and SFD3 are supplied to a summator SM1, each signal having the scaling factor 0.5. The output signal DIF2 from the summator is supplied to an input of the difference generator DB4, and when IA1 >IA2 or when IA3 >IA2 the signal causes a weakening of the field current of the motor M2 and hence an increase of the armature current of the motor into conformity with the armature currents of the other motors.

An analysis of the function of the system shows that under all circumstances at least one of the drive motors is working with full and unweakened field, which means that the risk of all the motors starting to work with a weakened field is completely eliminated. This is a consequence of the system having only two loadsharing regulators instead of one such regulator for each motor, as in previous systems. The pairwise comparison between armature currents means that the input signals to the loadsharing regulators may become both positive and negative. For this reason, there is no requirement, as in previous systems, that the armature currents of those motors which are working with field weakening are controlled towards a reference value which is lower than the highest of the armature currents of the motors. Instead, the system will be working such that the highest armature current constitutes a reference for the armature currents of the other motors, which means that the armature currents of all the motors will be controlled into equality with each other and with the highest armature current. In that way, the tractive effort of the motors can be utilized in full.

The scaling factor 0.5 on the inputs of the summator SM1 results in the amplification of the control loop for the field weakening of the motor M2 in certain cases becoming lower than in the other motors. However, this condition is no disadvantage since the loadsharing control loop has no superordinate feedback control. Furthermore, the scaling factor 0.5 shown in FIG. 1 is only an example and other values of the scaling factor may be selected.

What has been stated above is already known. The novel feature of the present invention is that a multiplier MP1 is switched in between the measured value IA1, which constitutes the armature current in the trailing axle motor, and the loadsharing regulator LDR1 (see FIG. 3). To this multiplier there is also connected on the input side a control signal GAIN, which may be controlled as desired at the potentiometer P4. The signal GAIN indicates a multiplication factor by which the multiplier MP1 multiplies the value of the current IA1. The signal IA1 * GAIN called IA1G, thus enlarged, is forwarded to the loadsharing regulator LDR1, where it is compared with the signal IA2 in the manner described. The magnitude of the signal GAIN may be chosen freely depending on the load conditions and the type of vehicle. Tests on six-axle locomotives showed that the value 1.25 provided an increase in tractive effort during those periods when, according to the invention, the logic was activated.

Under those operating conditions when the signal GAIN is activated, the signal IA1G will be interpreted by the loadsharing system as the currently prevailing armature current through the trailing axle motor. Upon comparisons in the loadsharing regulators LDR1 and LDR2 the currents IA2 and IA3 are lower than IA1G, whereupon the loadsharing according to the above starts adapting the currents IA2 and IA3 upwards to the magnitude of the signal IA1G. Finally, IA2 and IA3 reach the current reference value IAO. This will cause the armature currents for the corresponding motors for other axles than the trailing axle to be controlled into equality with each other and equal to the highest armature current, which consists of the apparent armature current IA1G in the trailing axle motor. This apparent armature current is utilized as the only armature current reference also if several motor groups, which each have their own loadsharing system according to the principle described above, are controlled with a superordinate control system, the trailing axle thus serving as a reference transducer for the actual speed for all the loadsharing systems.

If the currents IA1, IA2 and IA3 are, for example, identical and lie close to the current reference value IAO even when the system according to the invention is activated, IA2 and IA3 cannot be increased when IA1 is enlarged by the factor GAIN in the loadsharing system. Each such increase of, for example, IA2 means that this current may become greater than IAO, which results in $\Delta IA$ becoming negative and controlling the convertor SRA so that the armature current in the trailing axle motor M1 is reduced, whereas IA2 and IA3 continue to increase. Gradually, the condition of equilibrium presents itself:

$$IA1 * GAIN = IA2 = IA3 = IAO$$

Since the loadsharing feedback control interprets the measured armature current IA1 for the trailing axle motor as higher than IA2 and IA3, IA1 will be the only current that is not increased. The motor for the trailing axle will thus drive the axle with reduced torque, whereas all other axles are driven with full tractive effort. The reduced tractive effort on one axle is well compensated by a maximum utilization of the available tractive effort on the other axles under the operating conditions which prevail for the activation of the current reduction.

The main condition for activation of current reduction according to the invention has been mentioned above. If the desired condition is fulfilled, the reduction may be activated after 1 second, be in force for as long as the condition still applies and, for example, for 5 seconds after drop out of this conditional state. The enlargement of the armature current is accomplished with a multiplier which, in the example, has a ramp function of 5 seconds before the apparent armature current IA1G has increased from 1 to 1.25 of the previous value.

The above description shows how the loadsharing control is performed in the case of a group of commonly controlled motors which have three motors. The system may be enlarged in a simple manner to be used for a greater number of motors than three per motor group. In that case, for each added motor the system is enlarged with a loadsharing regulator, two signal distributors and one summator.

The drive system may also be reduced to comprise only two motors in one motor group, in which case the system is reduced to a corresponding extent with respect to the need for load regulator, signal distributor and summator (the summator then not being required).

The above description gives an example of a drive system according to the invention in which each motor branch has been considered to consist of one single motor and has been referred to throughout as a motor. However, the invention may just as well be applied to drive systems in which each motor branch consists, for example, of two or more motors with series-connected armature windings and mutually series-connected field windings. Furthermore, the invention has been described with reference to a drive system with separately-excited drive motors, but the invention may also be used with, for example, compound-excited drive motors. Thus, the invention has been described in connection with a drive system in which a common armature convertor feeds all the motor armatures in the system. However, the invention may also be applied to other types of commonly controlled motor systems, for example such where each motor group has its separate armature convertor, the armature convertors in the system then being controlled in parallel so that their output voltages are substantially identical. Similarly, only one group of commonly controlled motors has been dealt with above. Sometimes a vehicle has only one such group, but the invention may, of course, be applied also to vehicles which are provided with two or more such motor groups. Frequently occurring vehicle types have, for example, two motor groups with three motor branches each or on motor group with four motor branches.

The method described above for imparting to the loadsharing system an apparently too high value of a measured signal may, of course, be carried out using other logic elements than the described multiplier. Other feasible methods comprise changing the amplification of the measuring circuit in question, division between suitable signals or different types of feedback.

I claim:

1. A drive system for a railway vehicle, comprising:
   at least a first and second dc drive motor;
   means for common control of the armature currents supplied to the drive motors;
   field control units for individual control of the fields of the drive motors;
   a feedback control system for achieving uniform loadsharing between the drive motors by selectively influencing the field of each drive motor in dependence of a comparison between the armature currents of the drive motors;
   a multiplier adapted to generate a product signal which is the product of the armature current of the first drive motor and a signal with a settable value; and
   said feedback control system being responsive to said product signal for increasing the other armature currents to a maximum level while maintaining the first armature current at a reduced level for reducing the torque of the first drive motor to ensure that the axle of the first drive motor rotates without slipping thereby utilizing the speed of the axle as a reference for true speed.

2. A drive system according to claim 1, wherein the means for common control of the armature currents are activated upon the occurrence of torsional oscillations.

3. A drive system according to claim 2, wherein the means for common control of the armature currents are activated when the average armature current is lower than 90 percent of a selected armature current reference.

4. A drive system according to claim 2, wherein the means for common control of the armature currents are activated when the average armature current is lower than 95 percent of a selected armature current reference in the event of armature current hysteresis.

5. A drive system according to claim 1, wherein armature current reduction is carried out on that drive motor the driven axle of which has the best adhesion.

6. A method for obtaining a reference for the true speed of an axle in a drive system with slip control for a railway vehicle with a first drive motor and at least a second drive motor, comprising the steps of:
   driving a first axle by the first drive motor;
   commonly controlling the armature currents supplied to the drive motors;
   individually controlling the fields of the drive motors;
   selectively influencing the field of each drive motor with a feedback control system in dependence upon a comparison between the armature currents of the drive motors to obtain uniform loadsharing between the drive motors;
   measuring the speed of each axle and generating speed value signals corresponding to the speed of each axle, respectively;
   generating a gain signal with a settable value;
   generating a signal that is the product of the gain signal and the armature current of the first drive motor;
   increasing the armature currents of the other drive motors to a maximum level while maintaining the armature current of the first drive motor to ensure that the first axle driven by the first drive motor rotates without slipping, thereby ensuring that the first axle is then used as true speed by the slip control.

7. A method according to claim 6, wherein the axle driven by the first drive motor is the trailing axle of the railway vehicle.

8. A method according to claim 6, further comprising the step of determining which axle has the best adhesion and wherein the axle driven by the first drive motor is the axle with the best adhesion defined.

9. A method according to claim 7, wherein the highest of the armature currents is used as a reference for the armature currents of the drive motors, controlling the armature currents for the other drive motors than the first drive motor into equality with each other and with the highest armature current thereby ensuring that the tractive effort of the drive motors are maximized and using the speed of the first axle as the true speed for the slip control.

10. A method according to claim 8, wherein the highest of the armature currents is used as a reference for the armature currents of the drive motors, controlling the armature currents for the drive motors other than the first drive motor into equality with each other and with the highest armature current thereby ensuring that the tractive effort of the drive motors are maximized and using the speed of the first axle as the true speed for the slip control.

11. A method according to claim 6, further comprising the step of selectively connecting the gain signal to said feedback control system in accordance with the use of the first axle as true speed by the slip control.

12. A method according to claim 11, further comprising the steps of measuring the armature current reference and any hysteresis of the armature currents and connecting the gain signal to said feedback control system when the average of the armature currents is lower than 90 percent of the armature current reference.

13. A method according to claim 11, further comprising the steps of measuring the armature current reference and any hysteresis of the armature currents and connecting the gain signal to said feedback control system when the average of the armature hysteresis currents is lower than 95 percent of the armature current reference.

14. A drive system for a railway vehicle, comprising:
   at least a first and second dc drive motor;
   means for common control of the armature currents supplied to the drive motors;
   field control units for individual control of the fields of the drive motors;
   a feedback control system for achieving uniform loadsharing between the drive motors by selectively influencing the field of each draive motor in dependence of a camparison between the armature currents of the drive motors;
   means for measuring the speed of each axle and generating speed value signals corresponding to the speed of each axle, respectively;
   a multiplier adapted to generate a product signal which is the product of the armature current of the first drive motor and a signal with a settable value; and
   means for inputting the product signal as the armature current of the first drive motor in the feedback control system instead of the real armature current value.

15. A drive system according to claim 14, further comprising means for selectively connecting the value of the gain signal to the feedback control system for determining the use of the speed of the first axle as a reference for the true speed by the slip control.

* * * * *